(12) United States Patent
Martinique

(10) Patent No.: US 7,845,141 B2
(45) Date of Patent: *Dec. 7, 2010

(54) SHINGLE WITH INTERLOCKING WATER DIVERTER TABS

(75) Inventor: Jeff Martinique, Edwardsville, KS (US)

(73) Assignee: DaVinci Roofscapes, LLC, Kansas City, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/004,223

(22) Filed: Dec. 20, 2007

(65) Prior Publication Data

US 2008/0098684 A1    May 1, 2008

Related U.S. Application Data

(63) Continuation of application No. 11/077,845, filed on Mar. 11, 2005, now Pat. No. 7,331,150.

(60) Provisional application No. 60/552,418, filed on Mar. 11, 2004.

(51) Int. Cl.
  *E04B 1/00* (2006.01)
  *E04G 21/00* (2006.01)
  *E04G 23/00* (2006.01)
(52) U.S. Cl. .................... 52/748.1; 52/520; 52/526; 52/546; 52/527; 52/525; 52/533; 52/534
(58) Field of Classification Search .............. 52/527, 52/523, 525, 529, 530, 533, 534, 535, 536, 52/539, 541, 545, 546, 547, 555, 556, 520, 52/526, 748.1
See application file for complete search history.

(56) References Cited

U.S. PATENT DOCUMENTS

| | | | |
|---|---|---|---|
| 2,624,298 A | 1/1953 | Farren |
| 2,735,143 A | 2/1956 | Kearns |
| 2,830,546 A | 4/1958 | Rippe |
| 3,060,163 A | 10/1962 | Erchak |
| 3,269,075 A | 8/1966 | Cosden |
| 3,347,001 A | 10/1967 | Cosden |
| 3,579,940 A | 5/1971 | Greenleaf |
| 3,667,184 A | 6/1972 | Merrill |
| 3,852,934 A | 12/1974 | Kirkhuff |
| 3,903,340 A | 9/1975 | Shepard |
| 3,983,675 A | 10/1976 | Pearse |
| 4,010,590 A | 3/1977 | Reinke |
| 4,067,256 A | 1/1978 | Turner |
| 4,141,187 A | 2/1979 | Graves |
| 4,193,898 A | 3/1980 | Miller |
| 4,214,918 A | 7/1980 | Grat |
| 4,252,603 A | 2/1981 | Kharsus |

(Continued)

*Primary Examiner*—Richard E. Chilcot, Jr.
*Assistant Examiner*—Chi Nguyen

(57) ABSTRACT

A shingle includes a body having a top surface, a bottom surface, an upper end, a lower end, a first side, and a second side. The body has a width defined as the distance between the first and second sides and a length defined by the distance between the upper and lower ends. In a preferred embodiment, the shingle also includes a water diverter tab attached to the first side for channeling water onto the top surface of a lower adjacent shingle, and a recess adjacent to the second side for receiving the water diverter tab of a laterally adjacent shingle in an interlocking manner. An anchor tab attached to the second side secures the lower ends of adjacent, interlocked shingles.

8 Claims, 5 Drawing Sheets

U.S. PATENT DOCUMENTS

| | | | |
|---|---|---|---|
| 4,268,572 A | 5/1981 | Toland |
| 4,301,633 A | 11/1981 | Neumann |
| 4,514,947 A | 5/1985 | Grall |
| 4,914,885 A | 4/1990 | Baker |
| 5,070,671 A | 12/1991 | Fitfield |
| 5,174,092 A | 12/1992 | Naden |
| 5,189,083 A | 2/1993 | Gelles |
| 5,190,997 A | 3/1993 | Lindemann |
| 5,214,082 A | 5/1993 | Gelles |
| 5,215,598 A | 6/1993 | Kouzuma |
| 5,305,570 A | 4/1994 | Rodriguez |
| 5,437,735 A | 8/1995 | Younan |
| 5,502,940 A | 4/1996 | Fitfield |
| 5,528,872 A | 6/1996 | Rotter |
| 5,575,861 A | 11/1996 | Younan |
| 5,603,758 A | 2/1997 | Schreifels |
| 5,613,337 A * | 3/1997 | Plath et al. .................... 52/533 |
| 5,615,523 A | 4/1997 | Wells |
| 5,644,886 A | 7/1997 | Ekmark |
| 5,711,126 A | 1/1998 | Wells |
| 5,784,848 A | 7/1998 | Toscano |
| 5,902,683 A | 5/1999 | Sieloff |
| 5,974,756 A | 11/1999 | Alvarez |
| 6,070,384 A | 6/2000 | Cnich |
| 6,120,913 A | 9/2000 | Kluttz |
| 6,178,703 B1 | 1/2001 | Noone |
| 6,180,871 B1 | 1/2001 | Campbell |
| 6,194,519 B1 | 2/2001 | Blalock |
| 6,233,895 B1 | 5/2001 | Evans |
| 6,282,858 B1 | 9/2001 | Swick |
| 6,415,562 B1 | 7/2002 | Donaghue |
| 6,418,692 B1 | 7/2002 | Freshwater |
| 6,530,189 B2 | 3/2003 | Freshwater |
| 6,540,829 B2 | 4/2003 | Allman |
| RE38,210 E | 8/2003 | Plath |
| 6,619,006 B1 | 9/2003 | Shirola |
| 6,679,308 B2 | 1/2004 | Becker |
| 6,715,252 B2 | 4/2004 | Stahl |
| 6,729,081 B2 | 5/2004 | Nath |
| 6,758,019 B2 | 7/2004 | Kalkanoglu |
| 6,808,785 B1 | 10/2004 | Friedman |
| 6,907,702 B2 | 6/2005 | Gilbert |
| 7,003,922 B2 | 2/2006 | Fitfield |
| 7,118,794 B2 | 10/2006 | Kalkanoglu |
| 7,125,601 B1 | 10/2006 | Pinault |
| 7,140,153 B1 | 11/2006 | Humphreys |
| 7,155,866 B2 | 1/2007 | Bezubic, Jr. et al. |
| 7,241,500 B2 | 1/2007 | Shiao |
| 7,331,150 B2 * | 2/2008 | Martinique .................. 52/520 |
| 2002/0189188 A1 | 12/2002 | Iole |
| 2006/0260731 A1 | 11/2006 | Kalkanoglu |
| 2007/0107356 A1 | 5/2007 | Steffes |
| 2008/0028705 A1 | 2/2008 | Morse |

* cited by examiner

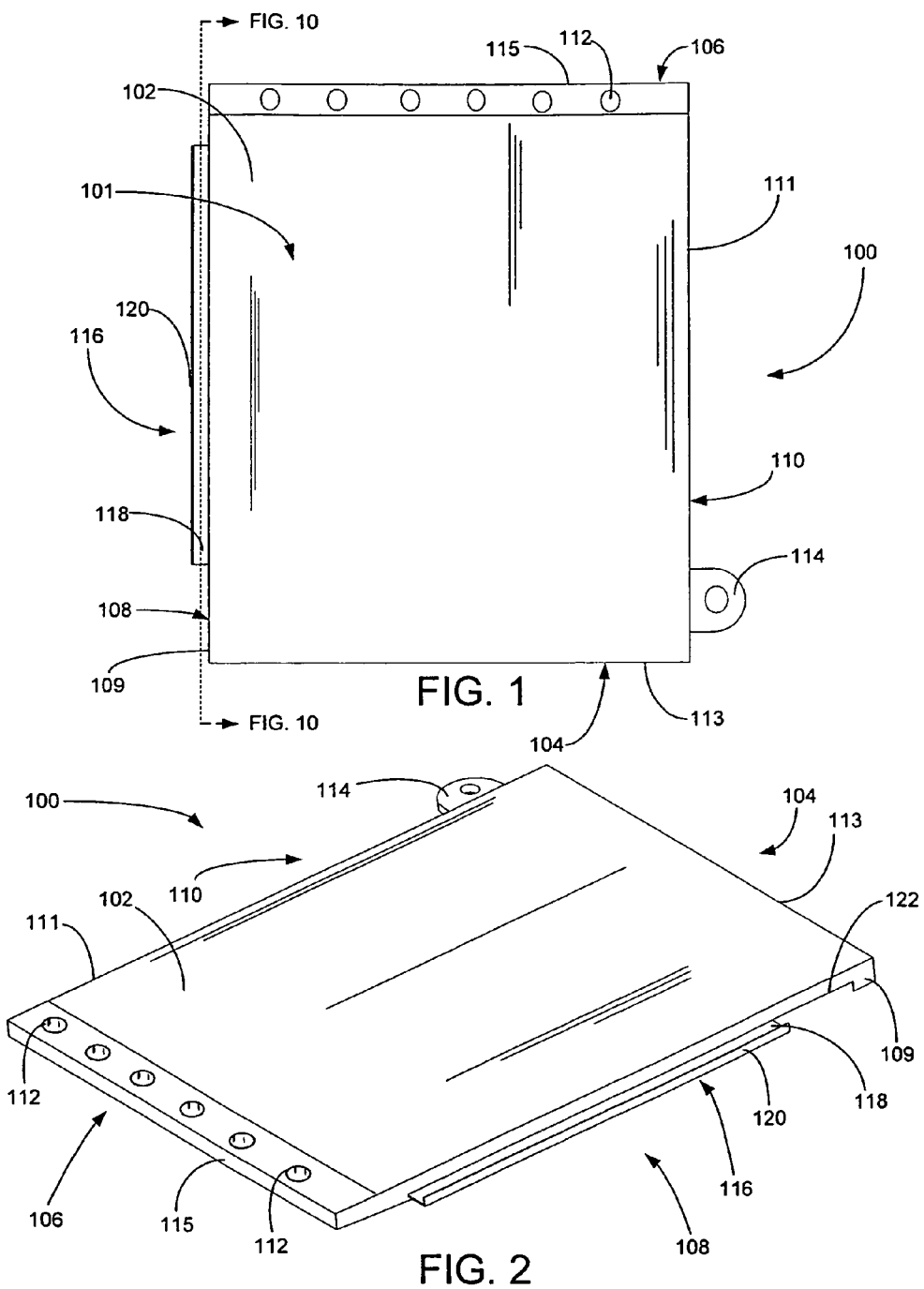

SHINGLE WITH INTERLOCKING WATER DIVERTER TABS

This application is a continuation of U.S. patent application Ser. No. 11/077,845, filed Mar. 11, 2005, now U.S. Pat. No. 7,331,150, which claims the benefit of U.S. Provisional Patent Application Ser. No. 60/552,418 entitled Shingle with Interlocking Water Diverter Tabs, filed Mar. 11, 2004, the disclosure of which is incorporated herein.

FIELD OF THE INVENTION

The present invention is generally related to improved building materials and more particularly related to shingles for roofing applications requiring resistance to high winds.

BACKGROUND OF THE INVENTION

The vast majority of roofing shingles in America are comparatively inexpensive, and are made from thin sheets of asphalt-coated building materials that are used in overlapping rows to protect the interior of a house from inclement weather. By contrast, the more expensive, "specialty" shingles have historically been constructed from a number of thicker, natural compositions, including natural slate, clay, wood and concrete. Recently, advances in polymer technology have enabled a new class of "synthetic" shingles to emerge, such that the look of more expensive natural materials can be mimicked by injection molded synthetic shingles, often at a lower total-installed cost.

Prior art synthetic shingles are typically rectangular in shape and have substantially flat top and bottom surfaces. These types of shingles are customarily installed by securing a first horizontal row, or "course," of shingles along the bottom of the roof in a line parallel to the roofline, or "eave." Shingles are secured independently, one shingle at a time, with what is typically a small gap or "keyway" between adjacent shingles. Also, in prior art shingles, each successive course of shingles overlays the previous course of shingles by at least 50%, so that precipitation of any kind will cascade down the roof, from one course of shingles to the next, so that water is conveyed from shingles at the top ridge of the structure down across the surface of the shingles, course after course, until it is shed from the roof safely to gutters or otherwise off of the home or building. The importance of overlapping shingles on a lower course with shingles on the next higher course by at least 50% is to ensure that water that flows down the roof structure does not trickle through the keyways between shingles in a way that would create the risk of water leaking down onto any of the underlying roof structure (underlayment materials or roof deck), which ultimately protects the valuable contents and inhabitants of any roofed structure.

Although widely accepted, prior art shingles and installation methods suffer a number of drawbacks. A large portion of each shingle is dedicated to providing the horizontal overlap needed to protect the underlying roof material from water draining into the keyways. This limits the percentage of actual exposure area provided by each prior art shingle to roughly 50% of its total size, and thereby increases the amount of roofing material actually required to successfully shed water from a roof by a factor of two. In addition, it is very difficult to maintain consistent alignment of the horizontal rows of shingles across the entire roof surface. Improper, uneven tilting of a single shingle in a way that is not exactly parallel to the eave can produce an exaggerated misalignment of subsequent adjacent shingles that are positioned with reference to the single improperly placed, uneven shingle. Accordingly, there is a need for an improved shingle that overcomes these and other deficiencies in the prior art.

SUMMARY OF THE INVENTION

In a preferred embodiment, the present invention includes a shingle configured for attachment to a roof. The shingle preferably includes a body having a first side wall and a second side wall, a water diverter tab attached to the first side wall and an anchor tab attached to the second side wall. The present invention also includes a method for installing shingles constructed in accordance with the preferred embodiment. The method includes the steps of securing a first shingle to an underlying surface by inserting at least one fastener through an upper end of the first shingle and at least one fastener through an anchor tab extending from a first side of the first shingle; interlocking a second shingle with the first shingle by inserting a water diverter tab connected to the second side of the second shingle through a water diverter tab opening in the first side of the first shingle; and securing the second shingle to the underlying surface by inserting at least one fastener through an upper end of the second shingle and at least one fastener through an anchor tab extending from a first side of the second shingle.

BRIEF DESCRIPTION OF THE DRAWINGS

FIG. 1 is a top plan view of a shingle constructed in accordance with a preferred embodiment of the present invention.

FIG. 2 is a perspective view of the top of a shingle constructed in accordance with a preferred embodiment of the present invention.

DETAILED DESCRIPTION OF A PREFERRED EMBODIMENT

Figure 3:
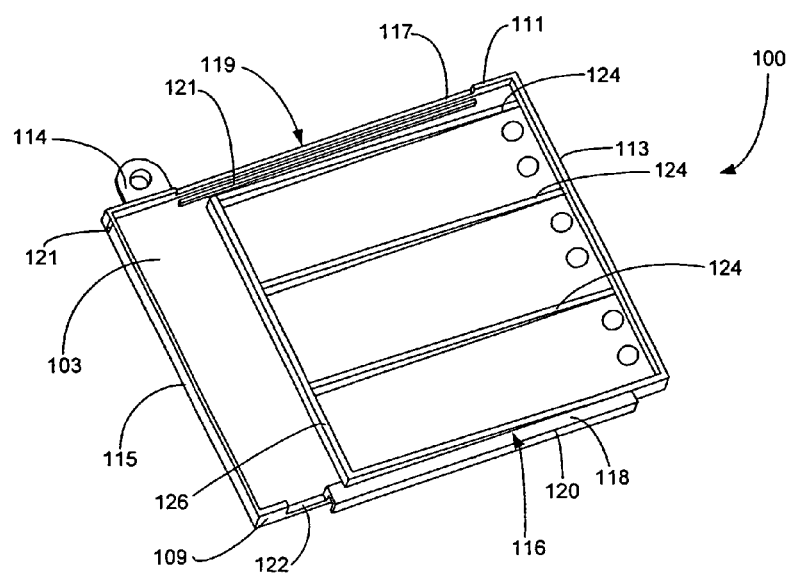
FIG. 3 is a perspective view of the bottom of the shingle of FIG. 1.

FIG. 1 shows a shingle 100 constructed in accordance with a preferred embodiment of the present invention. The shingle 100 has a body 101, an anchor tab 114, and a water diverter tab 116. The body 101 includes a top surface 102, a bottom surface 103 (shown in FIG. 3), a lower ("butt") end 104, an upper ("tip") end 106, a first side 108 and a second side 110. The shingle 100 preferably includes one or more fastener receiver areas 112 proximate the tip end 106. The fastener receiver areas 112 can be used to secure the upper end 106 of the shingle 100 to the underlying roof materials and roof deck through use of common fasteners, such as nails or screws. In a particularly preferred embodiment, the shingle 100 also includes a first side wall 109 adjacent to and extending downward from the first side 108, a second side wall 111 adjacent to and extending downward from the second side 110. The shingle 100 also includes a lower end wall 113 and an upper end wall 115 that extend downward from the lower and upper ends 104, 106.

In the presently preferred embodiment, the shingle 100 is constructed from synthetic materials. In a particularly preferred embodiment, the shingle 100 is constructed from one or more plastics that exhibit suitable flexibility and resilience to enable the use of standard roofing nails or standard roofing screws during the installation of the shingle 100. The materials selected for the construction of the shingle 100 should also permit the creation of selected textures on the top surface 102. For example, the shingle 100 may include a texture that resembles slate, clay tile, wood shake, tile or concrete tile shingles. Polyethylene-based plastics are presently preferred as the material of construction. Although synthetic materials are presently preferred, it will be understood that alternative formable materials, such as, for example, other polymers, metals, clay, concrete and ceramics, could also be used.

Figure 4:
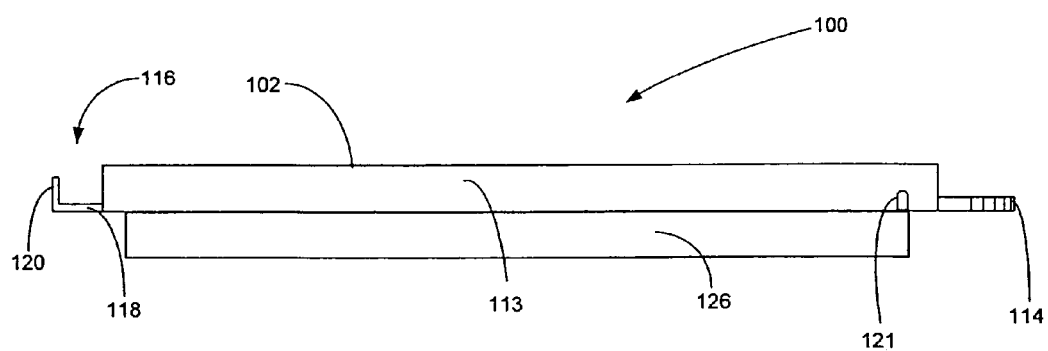
FIG. 4 is an elevational view of the lower end of the shingle of FIG. 3.

Referring now also to FIGS. 2-4, shown therein are a top perspective view, bottom perspective view and lower end elevational view, respectively, of the shingle 100. The shingle 100 preferably includes an anchor tab 114 connected to the second side 110 and a water diverter tab 116 connected to the first side 108. The anchor tab 114 is preferably configured to receive a suitable anchor, such as a nail or a screw, and is used in addition to the fastener receiver areas 112 to secure the shingle 100 to underlying roof materials. The anchor tab 114 forms a built-in "hurricane clip," and generally improves the resistance of the shingle 100 to high winds. The water diverter tab 116 preferably includes a base 118 and a "lip" 120 that extends upward from the base 118. The water diverter tab 116 forms a "gutter" that captures water between the lip 120 and first side wall 109.

In a preferred embodiment, the lip 120 of the water diverter tab 116 and the second side wall 111 are configured to form an interlocking relationship between laterally adjacent shingles 100a, 100b. The water diverter tab 116 is preferably received by a water diverter tab opening 117 in the second side wall 111 of a laterally adjacent shingle. The lip 120 of the water diverter tab 116 is preferably captured within a water diverter tab recess 119 in the laterally adjacent shingle. The recess 119 is preferably bounded by the second side wall 111 and a tab stop 121. The tab stop 121 is connected to the bottom surface 103 and preferably extends the length of the water diverter tab opening 117. The anchor tab 114 is preferably received by an anchor tab opening 122 in the first side wall 109 of a laterally adjacent shingle 100.

Figure 5:
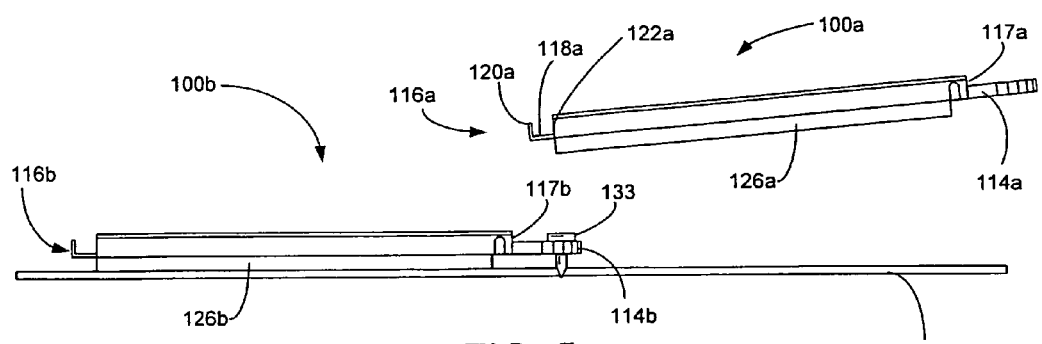
FIG. 5 is an elevational view of the lower end of two shingles during installation.
Figure 6:
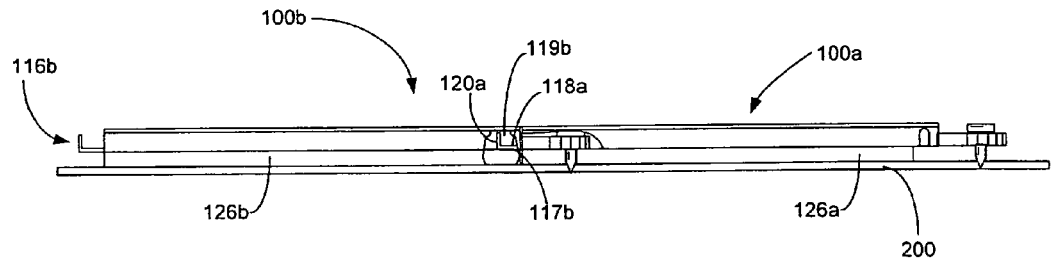
FIG. 6 is an elevational view of the lower end of two shingles during installation with a partial cutaway to reveal the interlocked water diverter tab and anchor tab.
Figure 7:
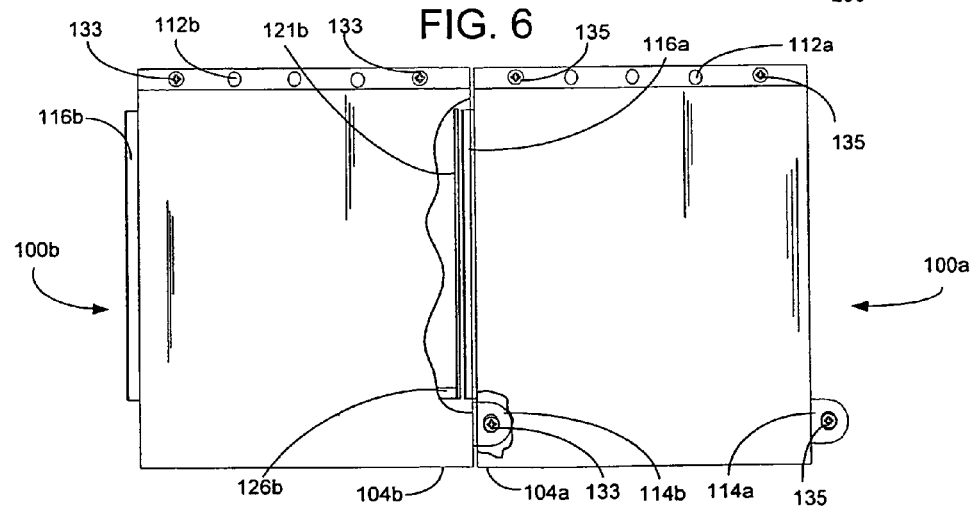
FIG. 7 is a top plan view with a partial cutaway of two shingles during installation with a partial cutaway to reveal the interlocked water diverter tab and anchor tab.

Turning to FIGS. 5-7, shown therein is the interlocking relationship created by the engagement of the water diverter tabs 116 and anchor tabs 114 of laterally adjacent shingles 100. During installation, a fixed shingle 100b is secured to the underlying surface 200 by placing fasteners 133 in the fastener receiver areas 112b and through the anchor tab 114b. The lip 120a of a free shingle 100a is then inserted through the water diverter tab opening 117b of the fixed shingle 100b. The free shingle 100a is then rotated into a position of contact with the underlying surface 200. As the free shingle 100a is rotated, the lip 120a is captured in the water diverter tab recess 119 between the second side wall 111b and the tab stop 121b of the fixed shingle 100b. At the same time, the anchor tab 114b and fastener 133 are received in the anchor tab opening 122 in the first side wall 109a of the free shingle 100a. The free shingle 100a can then be locked into position by placing fasteners 135 through fastener receiver areas 112a and anchor tab 114a. Thus, the fastened anchor tab 114b works to secure both of the lower ends 104a, 104b of the adjacent shingles 100a, 100b.

In this way, laterally adjacent shingles 100a and 100b can be "interlocked" using the water diverter tab 116 and anchor tab 114 such that all four corners of the free shingle 100a are secured to the underlying surface 200. Additionally, as demonstrated in FIG. 7, the interlocked water diverter tab 116a and anchor tab 114b cooperatively form a substantially continuous gutter between the adjacent shingles 100a and 100b. The interlocking relationship between laterally adjacent shingles 100a and 100b provides enhanced resistance to both precipitation and high winds.

The interlocking configuration also removes the need in the prior art for horizontally overlapping a significant proportion of adjacent shingles. Adjacent shingles 100 can be installed without significant horizontal overlap to maximize the amount of exposure area provided by each shingle as a percentage of the total surface area required by each shingle. Maximizing the amount of exposure area provided by each shingle reduces the number of shingles needed to cover a given surface area of a roof. Maximizing the percentage of total exposed surface area of a shingle reduces the amount of raw materials required to cover a given surface area of a roof. When combined, the larger exposure and the larger percentage of exposure per shingle provides a more efficient use of raw materials to achieve the water-shedding purpose of roofing shingles.

Referring back to FIG. 3, the shingle 100 also preferably includes a plurality of braces 124. The braces 124 preferably extend downward from the bottom surface 103 and extend a portion of the length of the shingle 100. The braces 124 enhance the resistance of the shingle 100 to impact from debris or hail as well as from compression under a sustained weight, such as the weight of a contractor standing on the shingle 100. Although three braces 124 are shown in FIG. 3, it will be understood the fewer or greater numbers of braces 124 could also be used, and that the configuration of these braces need not all be perpendicular to the lower end 104 of the shingle 100.

Each shingle 100 also preferably includes a small drain 121 in the lower end wall 113 in proximity to the water diverter recess 119. The drain 121 prevents water captured by the water diverter tab 116 and anchor tab 114 from pooling under the shingle 100. The shingle 100 can also include a cross-bar 126 that extends horizontally across the shingle 100. The cross-bar 126 provides rigidity to the shingle 100 and protects the roof from water penetration in the event the lower end 104 is raised by an updraft or vacuum. In the event an updraft or vacuum raises the lower end 104, the bottom of the cross-bar 126 remains in close proximity to the underlying structure.

Figure 8:
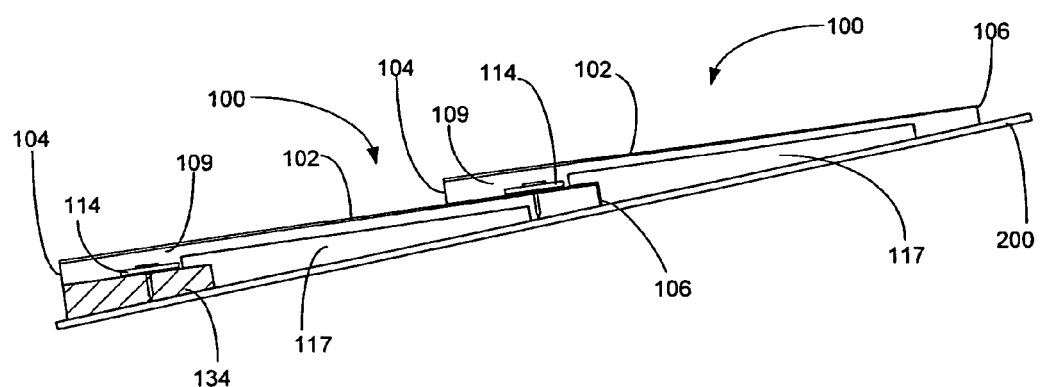
FIG. 8 is an elevational view of the second side of two vertically overlapping shingles constructed in accordance with the present invention.
Figure 9:
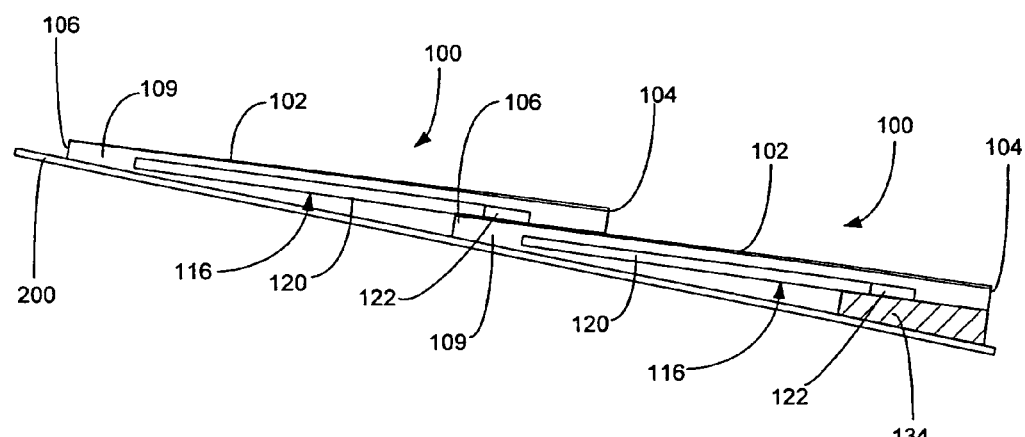
FIG. 9 is an elevational view of the first side of the shingles of FIG. 8.
Figure 10:
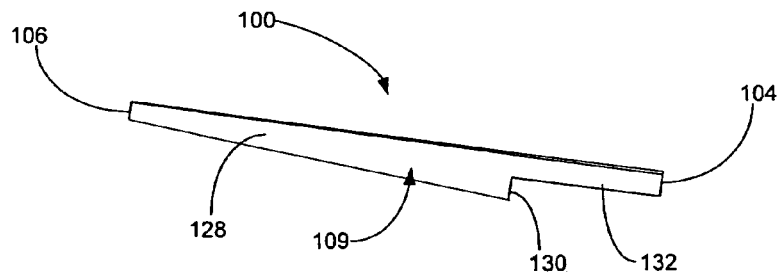
FIG. 10 is cross-sectional view of the first side of one of the shingles of FIG. 8 with the water diverter tab removed.

In a particularly preferred embodiment, the shingle 100 has a stepped-profile. FIG. 10 provides an elevational view of the first side wall 109 of the shingle 100 with the water diverter tab 116 removed for clarity. The first side wall 109 preferably includes a wedge-shaped upper portion 128, a substantially vertical step 130 and a thinner lower portion 132. The stepped profile of the side wall 109 is configured such that the wedge-shaped upper portion 128 supports the shingle 100 on an underlying surface. As shown in FIGS. 8 and 9, the step 130 is configured to rest on the upper end 106 of an adjacent lower shingle 100. In this way, the shingle 100 can be easily installed with reference to a lower shingle with little margin of error by simply resting shingle 100 on top of the lower shingle. The automatic alignment provided by the stepped side wall 109 greatly facilitates the installation of overlapping field shingles in subsequent courses. In a particularly preferred embodiment, the side walls 109, 111 and braces 124 are angled with respect to the top surface 102 to adjust the angle elevation of the shingle 100 off the underlying surface. Specifically, the braces 124 are angled in congruence with the wedge-shaped upper portion of side walls 109, 111. The stepped-profile also facilitates the insertion of the water diverter tab 116 into an adjacent shingle.

In addition to facilitating and improving installation operations, the stepped profile of the shingles 100 also eliminate the presence of the wedge-shaped recesses or "gaps" that result from the overlapped installation of conventional rectangular shingles. In the preferred embodiment, the wedge-shaped upper portion 128 is configured to substantially occupy the space or "gap" that would be present with standard planar rectangular shingles. In this way, the wedge-shaped upper portion 128 effectively seals the underside of the shingle 100. At the same time, the side walls 109, 111 are configured to accommodate the use with a traditional "starter" shingle 134, which eliminates the space between the underside of the shingle 100 and the roof surface 200 created by the stepped side walls 109, 111 on the first horizontal row of shingles 100 parallel to the eave of the roof surface 200.

Figure 11:
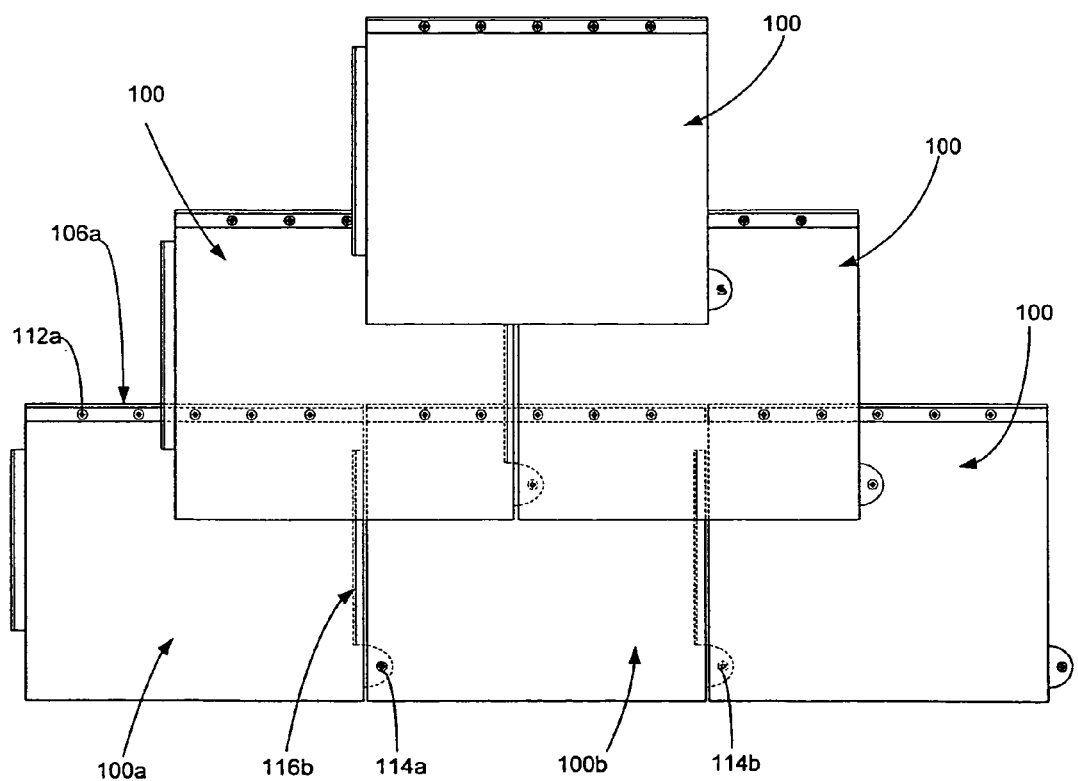
FIG. 11 is a top view of a preferred installation of a plurality of the shingles constructed in accordance with a preferred embodiment of the present invention.

FIG. 11 depicts a presently preferred arrangement of a plurality of shingles 100. It will be understood that there are a large number of installation methods and configurations for shingles constructed in accordance with the present invention. In a presently preferred embodiment, however, the shingles 100 are installed by first securing the bottom portion of a first shingle 100a to an underlying material through use of an appropriate fastener and the anchor tab 114. The upper left-hand corner of the first shingle can then be secured by driving a suitable fastener through one or more, preferably two, of the fastener receiver areas 112. A second shingle 100b is then positioned adjacent the first shingle 100a by sliding the water diverter tab 116b under the second side wall 111a of the first shingle 100a. The second shingle 100b is then "interlocked" in position adjacent the first shingle 100a. The installation of the first shingle 100a is completed by fastening the upper end 106a of the first shingle 100a by driving a suitable fastener through one or more of fastener receiver areas 112. Through this installation process, the water diverter tab 116b on the second shingle 100b is captured within the water diverter tab recess 119 in the first shingle 100a. This process of interlocking adjacent shingles can be repeated for subsequent shingles 100 in the same course. Subsequent courses of shingles 100 are preferably positioned with reference to the first course by utilizing the vertical step 130.

It is clear that the present invention is well adapted to carry out its objectives and attain the ends and advantages mentioned above as well as those inherent therein. While presently preferred embodiments of the invention have been described in varying detail for purposes of disclosure, it will be understood that numerous changes may be made which will readily suggest themselves to those skilled in the art and which are encompassed within the spirit of the invention disclosed herein and in the associated claims.

It is claimed:

1. A shingle configured for attachment to a roof, the shingle comprising:
    a body comprising a first side and a second side;
    wherein the first side comprises a water diverter tab and an anchor tab opening; and
    wherein the second side comprises an anchor tab and a water diverter tab opening.

2. The shingle of claim 1, wherein the water diverter tab comprises: a base; and a lip.

3. The shingle of claim 1, further comprising a plurality of braces extending downward from the body.

4. The shingle of claim 3, wherein the shingle further comprises a cross-bar extending downward from the body and connecting the plurality of braces.

5. The shingle of claim 3, wherein the shingle further comprises a first side wall and wherein the plurality of braces and the first side wall comprise a wedge-shaped portion.

6. The shingle of claim 1, further comprising: a first side wall extending downward from the first side and a second side wall extending downward from the second side.

7. A method for installing shingles, the method comprising:
    securing a first shingle, wherein the first shingle comprises an upper end and a first side comprising an anchor tab and a water diverter tab opening,
        to an underlying surface by inserting at least one fastener through the upper end of the first shingle and at least one fastener through the anchor tab of the first shingle;
    interlocking a second shingle with the first shingle, wherein the second shingle comprises an upper end, a first side comprising an anchor tab, and a second side comprising a water diverter tab,
        by inserting the water diverter tab of the second shingle through the water diverter tab opening of the first shingle; and
    securing the second shingle to the underlying surface by inserting at least one fastener through the upper end of the second shingle and at least one fastener through the anchor tab of the second shingle.

8. The method of claim 7, wherein the second side of the shingle further comprises an anchor tab opening, and wherein the interlocking step further comprises nesting the anchor tab of the first shingle in the anchor tab opening of the second shingle.

* * * * *